(12) United States Patent
Smith (10) Patent No.: US 9,452,658 B2
(45) Date of Patent: Sep. 27, 2016

(54) CONVERTIBLE LINK FOR AN ANTI-SWAY BAR

(71) Applicant: Justin Smith, Wittman, AZ (US)

(72) Inventor: Justin Smith, Wittman, AZ (US)

( * ) Notice: Subject to any disclaimer, the term of this patent is extended or adjusted under 35 U.S.C. 154(b) by 0 days.

(21) Appl. No.: 14/746,511

(22) Filed: Jun. 22, 2015

(65) Prior Publication Data

US 2016/0068034 A1 Mar. 10, 2016

(51) Int. Cl.
  *B60G 7/00* (2006.01)
  *B60G 21/055* (2006.01)
  *B60G 11/26* (2006.01)

(52) U.S. Cl.
  CPC ........... *B60G 21/0556* (2013.01); *B60G 7/001* (2013.01); *B60G 11/265* (2013.01); *B60G 2200/144* (2013.01); *B60G 2202/152* (2013.01); *B60G 2204/1224* (2013.01); *B60G 2204/422* (2013.01); *B60G 2204/4604* (2013.01); *B60G 2204/4605* (2013.01); *B60G 2206/111* (2013.01); *B60G 2800/0122* (2013.01); *B60G 2800/0124* (2013.01)

(58) Field of Classification Search
  CPC ................ B60G 7/001; B60G 11/265; B60G 2202/152; B60G 2204/422; B60G 2800/0124
  See application file for complete search history.

(56) References Cited

U.S. PATENT DOCUMENTS

| | | | | |
|---|---|---|---|---|
| 5,004,264 | A | * | 4/1991 | Kozaki ................ B60G 17/018 188/266.2 |
| 5,505,480 | A | * | 4/1996 | Pascarella .......... B60G 21/0553 267/188 |
| 2006/0163825 | A1 | * | 7/2006 | Hamm .................. B60G 7/006 280/5.502 |
| 2006/0180966 | A1 | * | 8/2006 | Miyashiro ........... B60G 13/005 267/221 |

* cited by examiner

*Primary Examiner* — Faye M Fleming
(74) *Attorney, Agent, or Firm* — Schmeiser, Olsen & Watts LLP (57) ABSTRACT

A convertible link for use with an anti-sway bar is provided. The convertible link includes a hydraulic cylinder having a link tube and a fluid shaft. The fluid shaft includes a piston coupled to a first end of the fluid shaft, wherein the fluid shaft and the piston are slidably coupled within the link tube. Fluid flows in and out of the hydraulic cylinder to move the hydraulic cylinder between a fixed and a moveable condition. In the fixed position the fluid shaft does not move with respect to the link tube and the anti-sway bar is operational to control roll. In the moveable condition the fluid shaft is moveable with respect to the link tube and the anti-sway bar is not operational to control roll.

12 Claims, 9 Drawing Sheets

CONVERTIBLE LINK FOR AN ANTI-SWAY BAR

BACKGROUND OF THE INVENTION

1. Technical Field

This invention relates generally to a link for an anti-sway bar and more particularly to a convertible link for an anti-sway bar.

2. State of the Art

Figure 1:
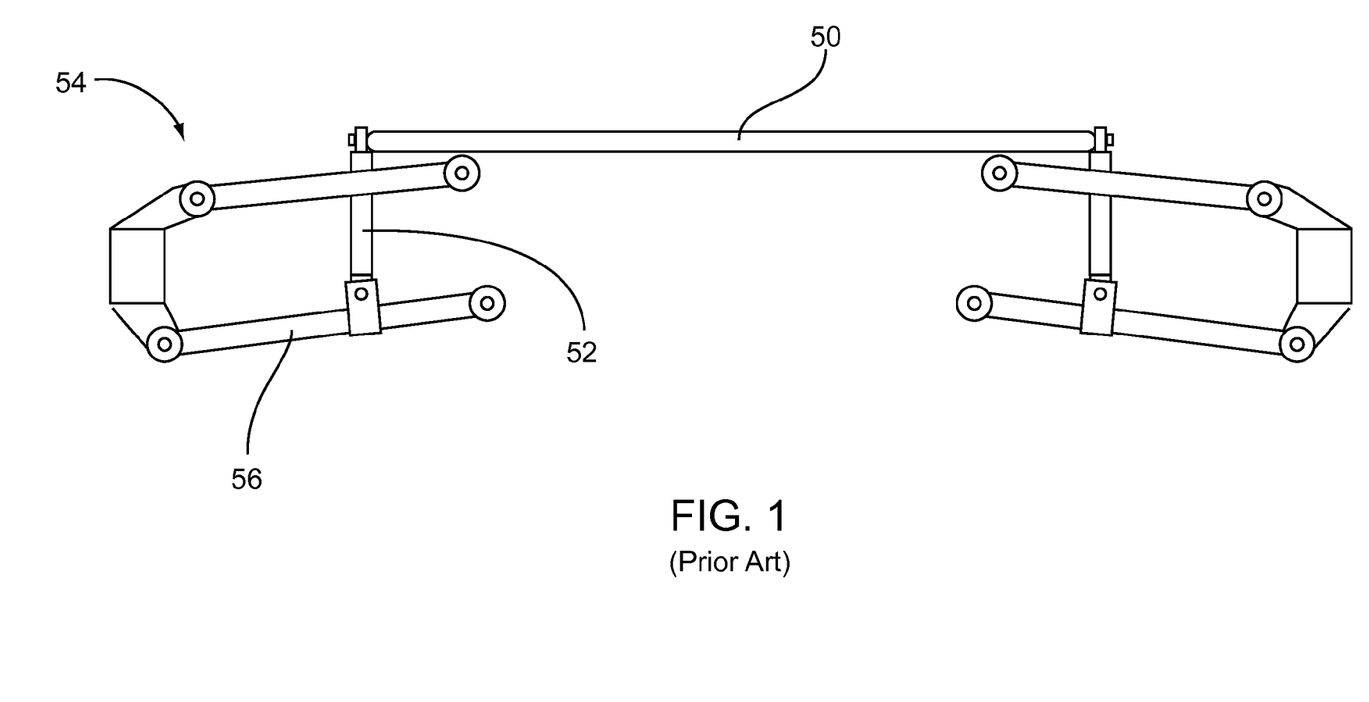
FIG. 1 is a front view of an anti-sway bar with a fixed link.
Figure 2:
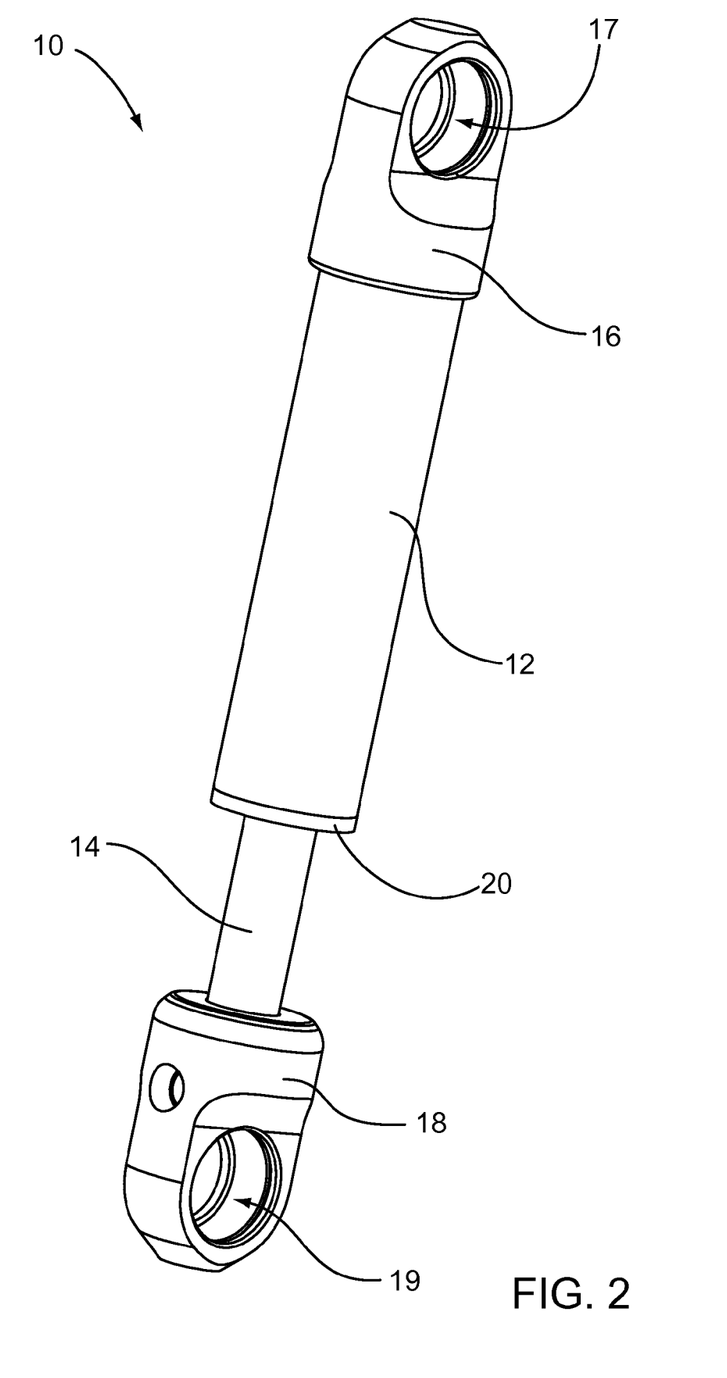
FIG. 2 is a perspective view of a convertible link for use with an anti-sway bar.
Figure 3:
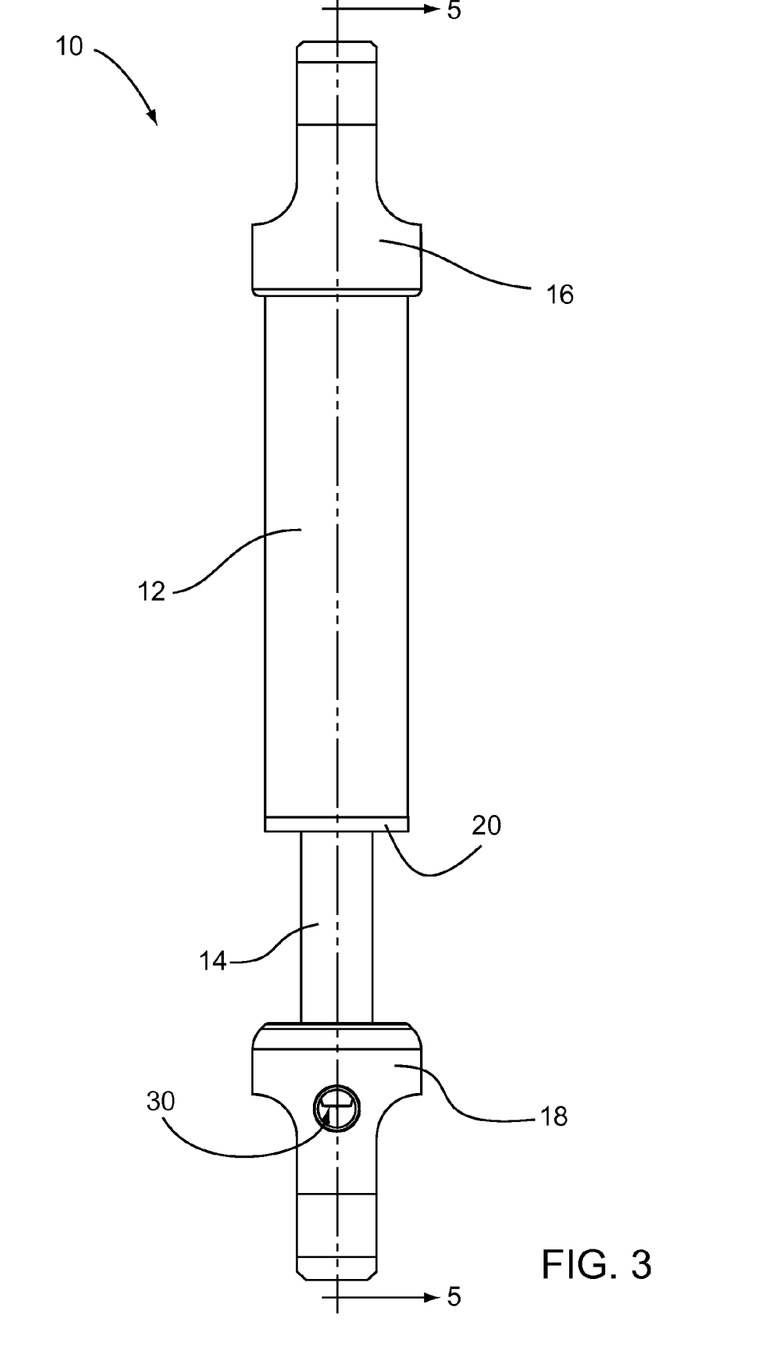
FIG. 3 is a side view of a convertible link for use with an anti-sway bar.
Figure 4:
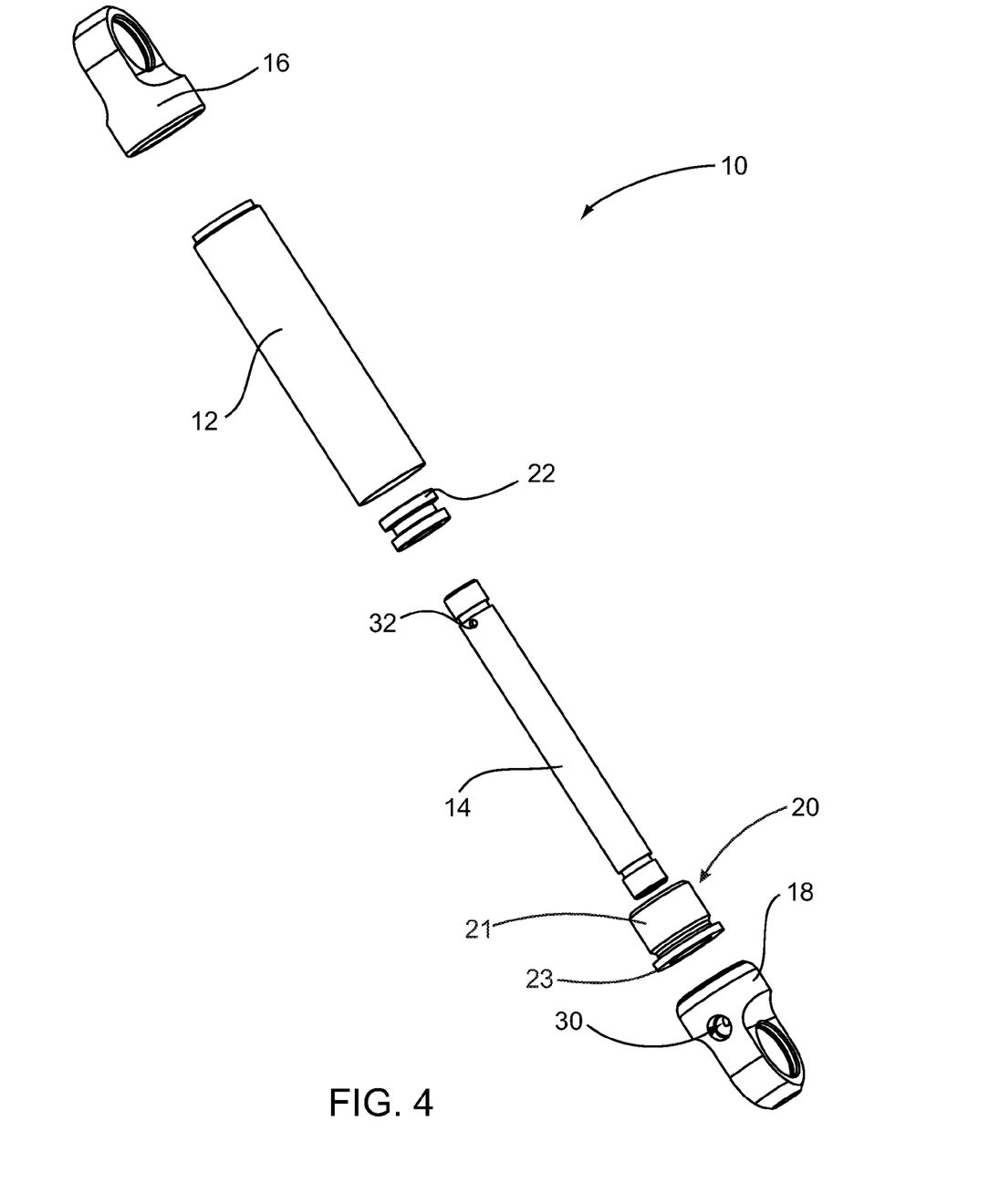
FIG. 4 is an exploded view of a convertible link for use with an anti-sway bar.
Figure 5:
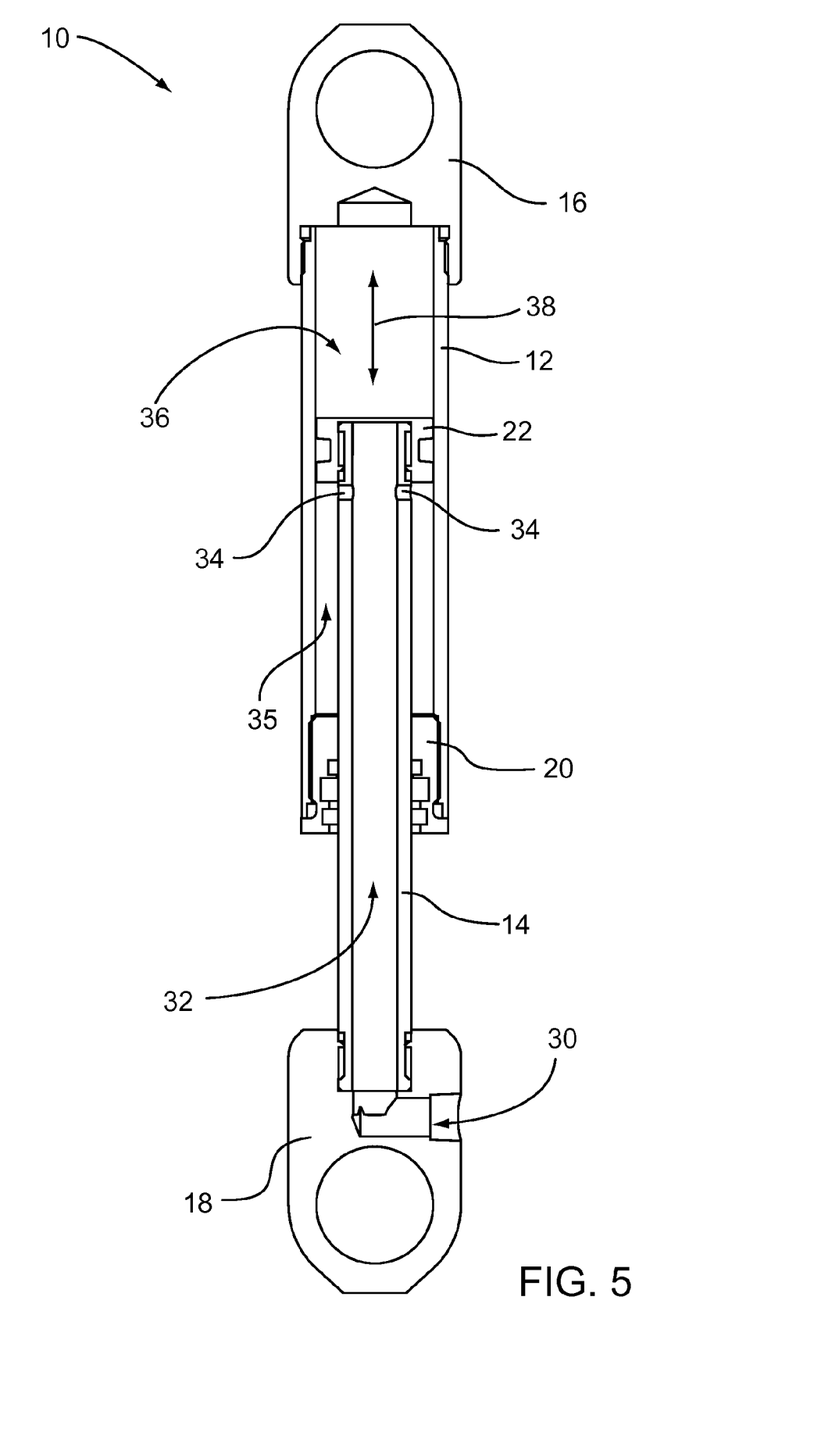
FIG. 5 is a section view taken along line 5-5 of FIG. 3 of a convertible link for use with an anti-sway bar.

An anti-sway bar is usually a torsion spring that resists body roll motions. As seen in FIG. 1, an anti-sway bar 50 is typically constructed out of a cylindrical steel bar in a U-shape. The anti-sway bar to the left and right side suspensions 54. If the left and right wheels move together, the bar 50 rotates about its mounting points. If the wheels move relative to each other, the bar 50 is subjected to torsional forces. Each end of the bar 50 is connected to a link 52 through a flexible joint. The sway bar link 52 may connect to a lower control arm 56 of suspension 54, transferring forces from a heavily-loaded axle to the opposite side.

Anti-sway bars provide two main functions. The first function is the reduction of body lean and to tune the handling balance of a vehicle. There are certain vehicles that seek to have the benefits of an anti-sway bar during some times and then the benefit of independent suspension at other times. However, these conventional anti-sway bars to not include a mechanism for easy converting between the function of an anti-sway bar and the function of independent suspension.

Accordingly, there is a need for an improvement in the field of anti-sway bars.

SUMMARY OF THE INVENTION

The present invention relates to a convertible link for an anti-sway bar, wherein the convertible link converts between a fixed link and a moveable link, thereby converting the suspension between an engaged anti-sway bar suspension to an independent suspension.

In an embodiment, the present invention includes a convertible link for use with an anti-sway bar, the convertible link comprising: a hydraulic cylinder comprising a link tube; and a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll.

In another embodiment, the present invention includes a vehicle comprises a frame and suspension; an anti-sway bar coupled to the frame; and a convertible link coupled between the anti-way bar and the suspension, wherein the convertible link comprises a hydraulic cylinder comprising: a link tube; and a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a convertible link for an anti-sway bar, wherein the convertible link converts between a fixed link and a moveable link, thereby converting the suspension between an engaged anti-sway bar suspension to an independent suspension.

In certain vehicles, such as off-road vehicles, there is the need and desire to have both an independent suspension and a semi-independent suspension depending on the terrain that the off-road vehicle is travelling. For example, if the off-road vehicle is traveling over very uneven terrain, such as boulder and the like, an independent suspension is desired in order to maintain traction even on uneven surfaces. Then, when the off-road vehicle is travelling along a more defined surface, such as a road or dirt road, it is desirable to reduce the roll and create a more semi-independent suspension wherein the movement of one wheel suspension affects the other wheel to provide more stability when turning and travelling on the more even surfaces.

Current methods require the removal of the linkage of the anti-sway bar in order to accomplish this. However, embodiments of the present invention as shown in FIGS. 2-5, overcome this limitation of current anti-sway links. FIGS. 2-5 depict a convertible link 10 for use with an anti-sway bar. Convertible link 10 replaces link 52 shown in FIG. 1, wherein convertible link 10 may be coupled between anti-sway bar 50 and control arm 56 of suspension 54.

Convertible link 10 may by a hydraulic cylinder and include a link tube 12, a fluid shaft 14, a link cap 16, a fluid shaft cap 18, an end cap 20 and a piston 22. Link tube 12 may include a first end 11 and a second end 13. Link cap 16 is coupled to first end 11 of link tube 12. Link cap 16 comprises an aperture 25 used to couple link cap 16 to anti-sway bar 50. Fluid shaft 14 may include a first end 15 and a second send 17. Piston 22 is coupled to first end 15 of fluid shaft 14 and fluid shaft cap 18 is coupled to second end 17 of fluid shaft 14. Fluid shaft cap 18 comprises an aperture 19 used to couple fluid shaft cap 18 to control arm 56. End cap 20 includes an aperture extending through end cap 20, wherein fluid shaft 14 extends through the aperture and end cap 20 is located between piston 22 and fluid shaft cap 18. The inner diameter of end cap 20 may be substantially the same as the outer diameter of fluid shaft 14. This allows for a fluid seal between fluid shaft 14 and the inner surface of end cap 20.

Link tube 12 may include an aperture extending through the length of link tube 12, wherein piston 22 is inserted within the aperture and is slidably coupled within link tube 12. The inner diameter of link tube 12 may be substantially the same as the outer diameter of piston 22. This allows for a fluid seal between piston 22 and the inner surface of link tube 12. Additionally, end cap 20 has a protrusion 21 extending from a base 23, wherein protrusion 21 is coupled to second end 13 of link tube 12. The inner diameter of link tube 12 is of a size to interfere with the outer diameter of protrusion 21 of end cap 20. In at least this way, end cap 20 is coupled to first end 13 of link tube 12 by an interference fit, thereby providing a fluid seal between end cap 20 and link tube 12 and further axially aligning link tube 12 and fluid shaft 14. It will be understood that while an interference fit is discussed in this disclosure, other ways of coupling end cap 20 to second end 13 of link tube 12 may be accomplished.

Coupling fluid shaft 14 to fluid shaft cap 18 places fluid shaft 14 in fluid communication with fluid shaft cap 18. When fluid shaft 14 is coupled to fluid shaft cap 18, a fluid inlet of fluid shaft cap 18 aligns with a fluid line 32. Fluid line 32 may comprise an inner volume within fluid shaft 14, or may be any similar type of means to transfer fluid. Fluid shaft 14 may include fluid outlet 34 that is in fluid communication with fluid line 32. This allows fluid to flow from fluid inlet 30 through fluid line 32 and out fluid outlet 34. When fluid shaft 14 is coupled to link tube 12, fluid flowing from fluid inlet 30 through fluid outlet 34 may enter inner volume 35 defined between the inner surface of link tube 12 and outer surface of fluid shaft 14 and between piston 22 and end cap 20. The fluid may flow under and increase pressure between piston 22 and end cap 20. The increase in pressure forces piston 22 to slide within link tube 12 in a direction indicated by arrow 38, wherein movement of piston 22 reduces inner volume 36 defined within link tube 12 between link cap 16 and piston 22. When fluid is not under pressure forcing the flow of fluid into inner volume 35, piston 22 is free to move in any direction indicated by arrow 38. This movement is generally determined by the off-road vehicle suspension movement. For example, as a wheel goes over uneven surfaces, the wheel will move up and down causing the suspension to react in similar up and down rotational movements. These up and down rotational movements result in movement of piston 22 in each direction depicted by arrow 38. This results in movement of fluid shaft in and out of link tube 12.

Accordingly, when fluid is flowed under pressure from fluid inlet 30 through fluid line 32 and out fluid outlet 34, the fluid is maintained under pressure to convert suspension 54 into a semi-independent suspension wherein anti-sway bar 50 is engaged to reduce roll of the vehicle while driving. When pressure is release from the fluid, the suspension 54 is converted into an independent suspension.

Figure 6:
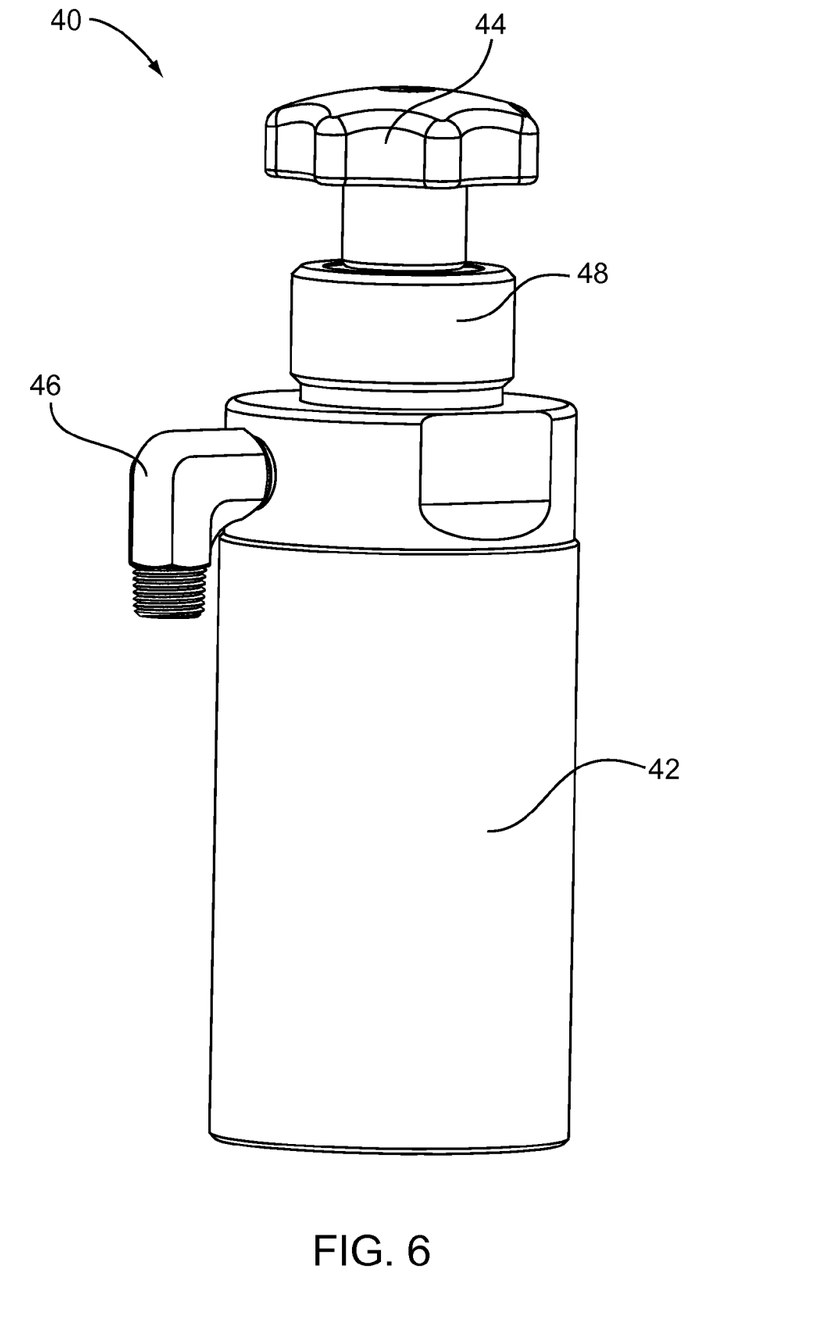
FIG. 6 is a perspective view of a valve for use with a convertible link for use with an anti-sway bar.

Referring further to the figures, FIG. 6 depicts a hydraulic valve 40 for use with convertible link 10, in accordance with embodiments of the invention. Valve 40 may comprise a reservoir tube 42 with an inner volume, a valve body 48 coupled to reservoir tube 42, a valve actuator 44 operatively coupled to valve body 48 and a valve outlet 46. Valve outlet 46 may be connected to fluid inlet 30 of convertible link 10 by one fluid hose or the like (not shown), to create a fluid connection between valve 40 and convertible link 10. Valve actuator 44 may be manually activated in order to direct fluid from reservoir tube through valve outlet 46, through the fluid connection and into fluid inlet of convertible link 10. This fluid is directed under pressure and is used to operate convertible link 10. Valve 40 may be located within a cockpit of off-road vehicle with easy access by a driver in order to operate convertible link 10 while driving to provide on demand conversion between semi-independent suspension and independent suspension.

Other hydraulic systems conventionally use two fluid hoses to connect the valve to the hydraulic cylinder 10, wherein pressure from fluid flowing through one moves the piston one direction and the then pressure from fluid flowing through the other hose moves the piston in an opposite direction. In some embodiments of the present invention, only one hose is utilized with a single inlet 30 of the convertible link 10 that is connected to the valve 40. This allows for fluid to be directed to the convertible link 10 with pressure to be utilized to move the piston 22 one direction and held under pressure to maintain the piston 22 in that position. Once the pressure is released the piston 22 can move freely in both directions. In these embodiments, the convertible link 10 may include an automatic collapses feature, wherein due to pressure in the reservoir system. For example, if the convertible link 10 is in an extended position and there is chassis clearance problem, the convertible link 10 may collapse automatically.

Figure 7:
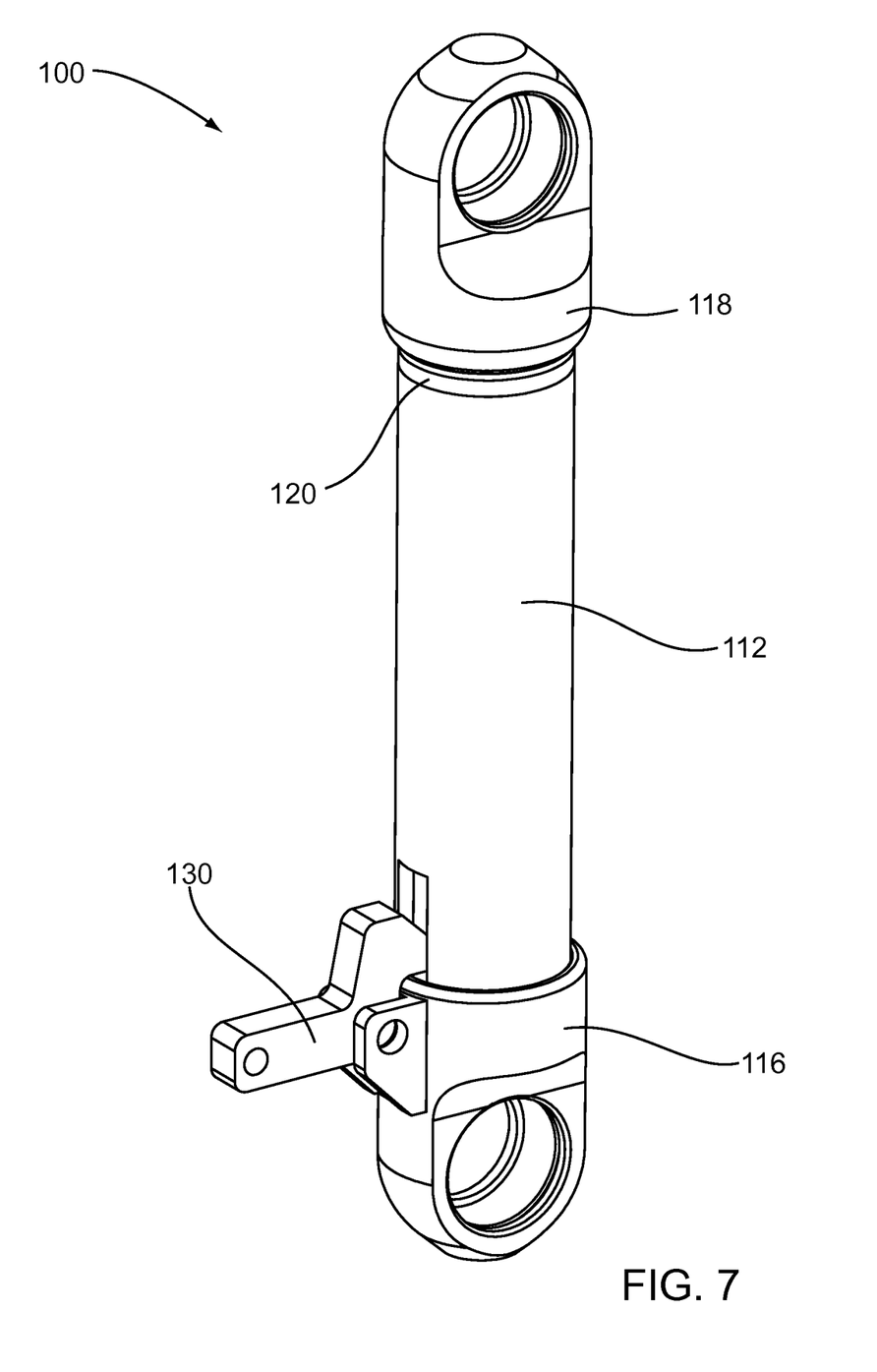
FIG. 7 is a perspective view of another convertible link for use with an anti-sway bar.
Figure 8:
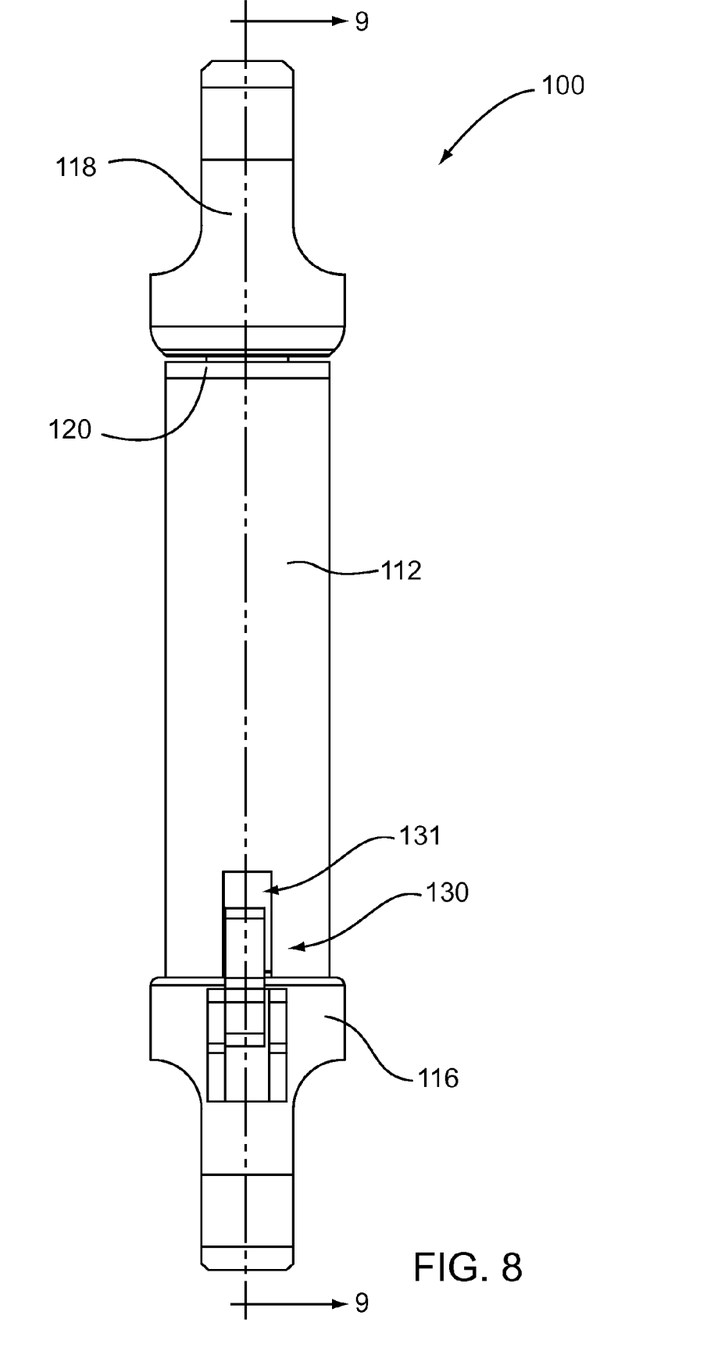
FIG. 8 is a side view of the convertible link of FIG. 7 for use with an anti-sway bar.
Figure 9:
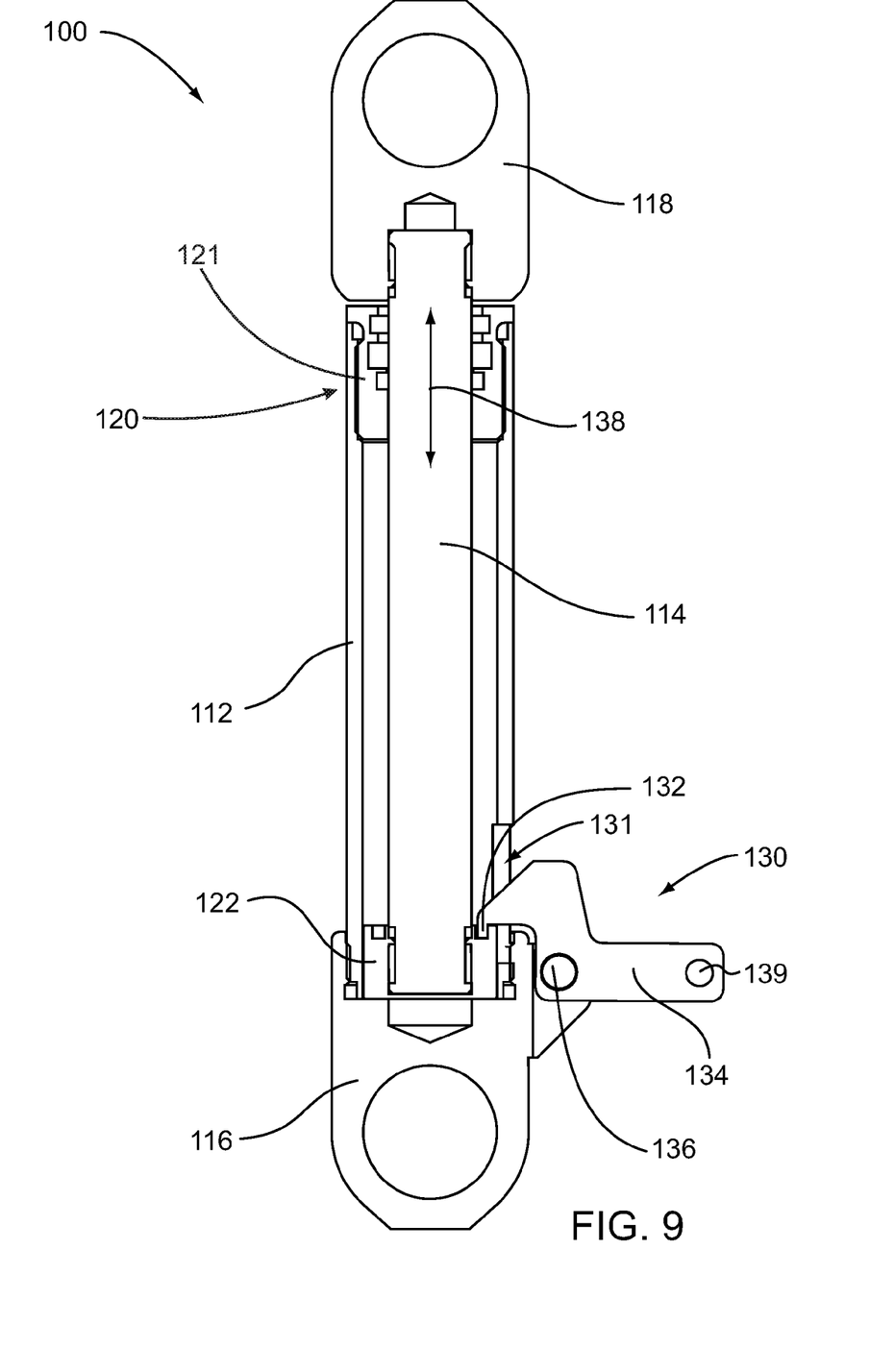
FIG. 9 is a section view taken along line 9-9 of FIG. 8 of a convertible link for use with an anti-sway bar.

Referring again to the drawings, FIGS. 7-9 depict another embodiment of a convertible link 100. Convertible link 110 may by a mechanical cylinder and include a link tube 112, a shaft 114, a link cap 116, a shaft cap 118, an end cap 120 and a piston 122. Link tube 112 may include a first end 111 and a second end 113. Link cap 116 is coupled to first end 111 of link tube 112. Link cap 116 comprises an aperture 125 used to couple link cap 116 to anti-sway bar 50. Fluid shaft 114 may include a first end 115 and a second send 117. Piston 122 is coupled to first end 115 of shaft 114 and fluid shaft cap 118 is coupled to second end 117 of shaft 114. Shaft cap 118 comprises an aperture 119 used to couple shaft cap 118 to control arm 56. End cap 120 includes an aperture extending through end cap 120, wherein shaft 114 extends through the aperture and end cap 120 is located between piston 122 and shaft cap 118. The inner diameter of end cap 120 may be substantially the same as the outer diameter of shaft 114. This allows for a fluid seal between shaft 114 and the inner surface of end cap 120.

Link tube 112 may include an aperture extending through the length of link tube 112, wherein piston 122 is inserted within the aperture and is slidably coupled within link tube 112. The inner diameter of link tube 112 may be substantially the same as the outer diameter of piston 122. This allows for a fluid seal between piston 122 and the inner surface of link tube 112. Additionally, end cap 120 has a protrusion 121 extending from a base 123, wherein protrusion 121 is coupled to second end 113 of link tube 112. The inner diameter of link tube 112 is of a size to interfere with the outer diameter of protrusion 121 of end cap 120. In at least this way, end cap 120 is coupled to first end 113 of link tube 112 by an interference fit, thereby providing a fluid seal between end cap 120 and link tube 112 and further axially aligning link tube 112 and shaft 114. It will be understood that while an interference fit is discussed in this disclosure, other ways of coupling end cap 120 to second end 113 of link tube 112 may be accomplished.

Link cap 116 includes a lock mechanism 130 coupled to an outer surface of link cap 116. Lock mechanism 130 may include a protrusion 132 extending therefrom, wherein protrusion 132 is configured to extend into aperture 131 located in a first end 111 of link tube 112. As protrusion 132 extends into aperture 131 is engages piston 122 in order to lock piston 122 in a fixed position with respect to link tub 122. This inhibits movement of shaft 114 in and out of link tube 112. Lock mechanism 130 may include an actuation arm 138 and a pivot rod 136 operatively coupling lock mechanism 130 to link cap 116. Actuator arm 138 may include an aperture 139 that may be used to couple to a cable or the like wherein pulling the cable applies force on actuator arm 138 resulting in rotating lock mechanism 130 about pivot rod 136 to remove protrusion 132 from within aperture 131 of link 112 to disengage piston 122. In this condition, piston 122 may slide within link tube 112 in a direction indicated by arrow 138. This movement is generally determined by the off-road vehicle suspension movement. For example, as a wheel goes over uneven surfaces, the wheel will move up and down causing the suspension to react in similar up and down rotational movements. These up and down rotational movements result in movement of piston 122 in each direction depicted by arrow 138. This results in movement of shaft 114 in and out of link tube 112.

Tension in the cable may be released and lock mechanism 130 may rotate again about pivot rod 136 and protrusion 132 may extend into aperture 131 of link tube 112. In this condition, as gravity moves the off-road vehicle into a default suspension position, lock mechanism 130 automatically engages piston 122 and locks piston 122 in a fixed position.

Accordingly, when lock mechanism 130 engages piston 122, convertible link 100 converts suspension 54 into a semi-independent suspension wherein anti-sway bar 50 is engaged to reduce roll of the vehicle while driving. When lock mechanism 130 is disengaged from piston 122, the suspension 54 is converted into an independent suspension.

According to some embodiments, the present invention may include a vehicle comprising a frame and suspension, an anti-sway bar 50 coupled to the frame; and a convertible link 10 coupled between the anti-way bar 50 and the suspension. The convertible link 10 may be a hydraulic cylinder. The convertible link 10 may include a link tube; and a fluid shaft having a piston coupled a first end of the fluid shaft, wherein the fluid shaft and the piston are slidably coupled within the link tube, wherein fluid flows in and out of the hydraulic cylinder between a fixed and a moveable condition, wherein in the fixed position, the anti-sway bar is operational to control roll and in the moveable condition, the anti-sway bar is not operational to control roll.

The vehicle may further comprise a valve 40 located in a cockpit of the vehicle and in fluid communication with the hydraulic cylinder, wherein the valve 40 controls flow of fluid into and out of the hydraulic cylinder of the convertible link 10. The hydraulic cylinder is moveable into the fixed condition in response to fluid flowed into the hydraulic and maintained under pressure by the valve. Moving the hydraulic cylinder into the fixed condition converts the suspension of the vehicle into a semi-independent suspension wherein the anti-sway bar is engaged to reduce roll of the vehicle. The hydraulic cylinder is moveable into the moveable condition in response to releasing pressure of the fluid in the hydraulic cylinder allowing fluid to freely flow in and out of the hydraulic cylinder. Moving the hydraulic cylinder into the moveable condition converts the suspension of the vehicle into an independent suspension.

Accordingly, the components defining any convertible link may be formed of any of many different types of materials or combinations thereof that can readily be formed into shaped objects provided that the components selected are consistent with the intended operation of a convertible link. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any convertible link may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A convertible link for use with an anti-sway bar, the convertible link comprising:
   a hydraulic cylinder comprising:
       a link tube;

a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll;

a link cap coupled to a first end of the link tube, wherein the link cap comprises an aperture used to couple the link cap to the anti-sway bar;

a fluid shaft cap coupled to a second end of the fluid shaft, wherein the fluid shaft cap comprises an aperture used to couple the fluid shaft cap to a control arm of vehicle suspension; and an end cap, wherein the end cap includes an aperture extending through the end cap and the fluid shaft extends through the aperture and is located between the piston and the fluid shaft cap;

wherein an inner diameter of the end cap is substantially the same as an outer diameter of the fluid shaft to form a fluid seal between the fluid shaft and the end cap, wherein the link tube includes an aperture extending through a length of the link tube, wherein the piston is inserted within the aperture and is slidably coupled within the link tube, wherein the link tube comprises an inner diameter that is substantially the same as an outer diameter of the piston to form a fluid seal between the piston and the link tube, and wherein the end cap comprises a protrusion extending from a base, and wherein the protrusion is coupled to a second end of the link tube.

2. The convertible link of claim 1, wherein the inner diameter of the link tube is a size to interfere with an outer diameter of the protrusion of the end cap to form and interference fit when the end cap is coupled to the first end of the link tube to provide a fluid seal between the end cap and the link tube and to axially align the link tube and the fluid shaft.

3. The convertible link of claim 2, wherein the fluid shaft further comprises a fluid line extending through the fluid shaft and a fluid outlet, wherein when the fluid shaft is coupled to the fluid shaft cap, the fluid line is in fluid communication with the a fluid inlet of the fluid shaft cap to allow fluid to flow from the fluid inlet through the fluid outlet and from the fluid outlet through the fluid inlet.

4. The convertible link of claim 3, wherein the hydraulic cylinder is moveable into the fixed condition in response to fluid flowed from the fluid inlet through the fluid line and out the fluid outlet into an inner volume of the link tube and maintained under pressure.

5. The convertible link of claim 4, wherein moving the hydraulic cylinder into the fixed condition converts suspension of a vehicle into a semi-independent suspension wherein anti-sway bar is engaged to reduce roll of the vehicle.

6. The convertible link of claim 5, wherein the hydraulic cylinder is moveable into the moveable condition in response to releasing pressure of the fluid allowing fluid to freely flow from the fluid outlet through the fluid line and out the fluid inlet or from the fluid inlet through the fluid line and out the fluid outlet.

7. The convertible link of claim 6, wherein moving the hydraulic cylinder into the moveable condition converts the suspension of the vehicle into an independent suspension.

8. A vehicle comprising:
a frame and suspension;
an anti-sway bar coupled to the frame; and
a convertible link coupled between the anti-way bar and the suspension, wherein the convertible link comprises a hydraulic cylinder comprising:
a link tube;
a fluid shaft having a piston coupled to a first end of the fluid shaft, wherein the fluid shaft and the piston are slidably coupled within the link tube, wherein fluid flows in and out of the hydraulic cylinder to move the hydraulic cylinder between a fixed and a moveable condition, wherein in the fixed position, the fluid shaft is fixed with respect to the link tube and the anti-sway bar is operational to control roll and in the moveable condition, the fluid shaft is moveable with respect to the link tube and the anti-sway bar is not operational to control roll; and
a valve located in a cockpit of the vehicle and in fluid communication with the hydraulic cylinder, wherein the valve controls flow of fluid into and out of the hydraulic cylinder of the convertible link.

9. The vehicle of claim 8, wherein the hydraulic cylinder is moveable into the fixed condition in response to fluid flowed into the hydraulic and maintained under pressure by the valve.

10. The vehicle of claim 9, wherein moving the hydraulic cylinder into the fixed condition converts the suspension of the vehicle into a semi-independent suspension wherein the anti-sway bar is engaged to reduce roll of the vehicle.

11. The vehicle of claim 10, wherein the hydraulic cylinder is moveable into the moveable condition in response to releasing pressure of the fluid in the hydraulic cylinder allowing fluid to freely flow in and out of the hydraulic cylinder.

12. The vehicle of claim 11, wherein moving the hydraulic cylinder into the moveable condition converts the suspension of the vehicle into an independent suspension.

* * * * *